W. H. PRATT & A. J. R. FIEGO.
BEARING FOR THE SHAFTS OF MEASURING INSTRUMENTS.
APPLICATION FILED APR. 22, 1904.
1,088,839.
Patented Mar. 3, 1914.
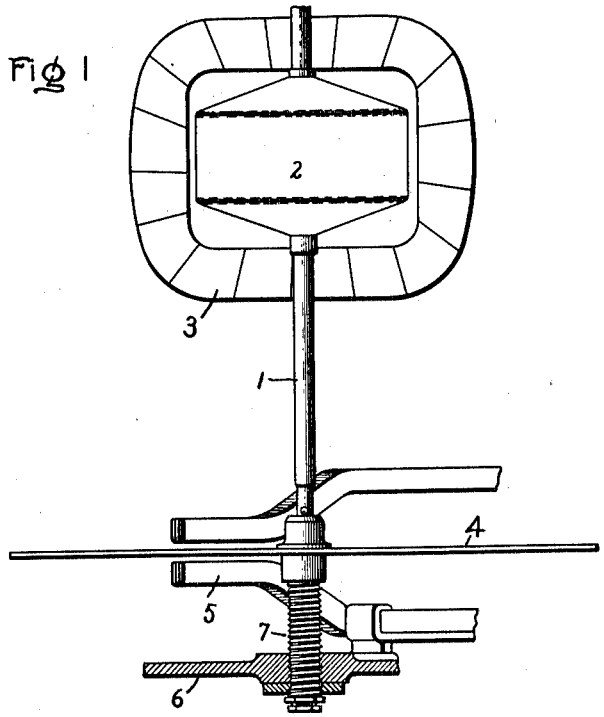
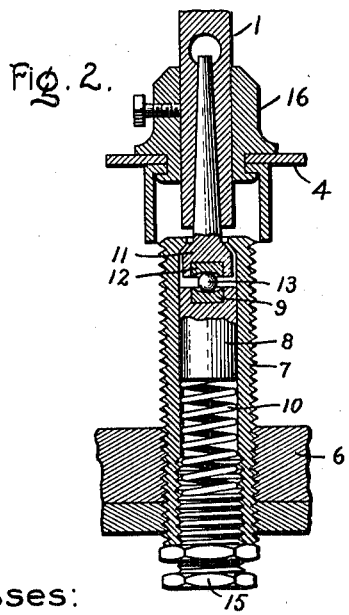
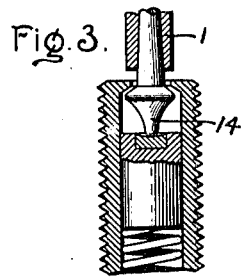
Witnesses:
Inventors:
William H. Pratt,
Alexander J. R. Fiego,
by
Atty.

UNITED STATES PATENT OFFICE.

WILLIAM H. PRATT AND ALEXANDER J. R. FIEGO, OF LYNN, MASSACHUSETTS, ASSIGNORS TO GENERAL ELECTRIC COMPANY, A CORPORATION OF NEW YORK.

BEARING FOR THE SHAFTS OF MEASURING INSTRUMENTS.

1,088,839. Specification of Letters Patent. Patented Mar. 3, 1914.

Application filed April 22, 1904. Serial No. 204,338.

*To all whom it may concern:*

Be it known that we, WILLIAM H. PRATT and ALEXANDER J. R. FIEGO, citizens of the United States, residing at Lynn, county of Essex, State of Massachusetts, have invented certain new and useful Improvements in Bearings for the Shafts of Measuring Instruments, of which the following is a specification.

This invention relates to bearings for the shafts of meters or similar delicate instruments in which friction must be eliminated so far as is possible.

The step bearings commonly employed in meters usually consist of a bearing post carrying a spring-supported jewel on which rests the lower end of the meter-shaft, the latter being provided with a pivot of suitable construction. We have found it desirable to have these parts of the bearing combined into a self-contained unit which may be removed from the meter without dislocation. We have therefore provided a removable pivot for the end of the meter-shaft so arranged that it interlocks with the bearing post and is therefore removed with the bearing post from the meter.

The novel features which we believe to be characteristic of our invention will be definitely indicated in the claims appended hereto; the details of construction and the mode of operation will be better understood by reference to the following description taken in connection with the accompanying drawings which show one embodiment of our invention.

In the drawings, Figure 1 is an elevation, broken away and sectioned in part, of a portion of an integrating wattmeter equipped with our improvements, the meter shown in the drawings being the well-known Thomson recording wattmeter; Fig. 2 is a sectional view of the lower bearing; and Fig. 3 is a similar view of a slightly modified form of bearing.

Referring to the drawings, Fig. 1 shows a meter having a rotatable shaft 1, an armature 2 carried thereby, field coils 3 for the armature, a brake disk 4 also carried by shaft 1, and damping magnets 5 coöperating with disk 4 to retard the rotation of the shaft. The shaft 1 of the meter is preferably of tubular form in order to reduce the weight of the moving element and extends upward through an opening in the frame 6 of the meter, and drives a suitable recording mechanism which, with the commutator and upper bearing of the meter, is not shown.

The lower step bearing for the shaft 1 consists of a bearing post 7 fitting in a threaded bore in the meter frame 6. Post 7 is a hollow screw having a plug 8 therein carrying a jewel 9 and supported by a coiled spring 10. The lower end of shaft 1 is provided with a pivot 11, carrying a jewel 12 in its lower end and a small highly-polished steel ball 13 is placed between the jewels 9 and 12, as shown in Fig. 2; or the pivot 11 may be provided with a hardened point 14 which rests directly upon the jewel 9, as shown in Fig. 3. The distinctive feature of this bearing is that the lower end of the pivot 11 is enlarged and the upper end of the bearing post 7 is spun over or contracted so that the pivot 11 cannot be drawn through the opening in the upper end of the post 7. By this construction, when the bearing post is removed from the meter the pivot 11 is removed with it, and the bearing post is provided with a removable end-plug 15 in its lower end which may be withdrawn to provide an opening through which all the parts may be taken out for the purpose of inspection or renewal. A transverse opening is provided in shaft 1 near its lower end into which the upper end of pivot 11 extends to facilitate the removal of the pivot in case it should stick. Secured on the lower end of shaft 1 is a suitable dust guard 16 which extends down over the end of the bearing post to prevent dust from entering and settling on the jewel.

We have shown and described our improvements herein as applied to an integrating wattmeter but it must be understood that they are applicable generally to delicate instruments in which friction must be reduced to a minimum. Also we do not wish to be limited to the precise construction, as many variations can be made therein which we consider within the spirit of our invention and which we aim to cover in the appended claims.

What we claim as new and desire to secure by Letters Patent of the United States, is:

1. A bearing for the shaft of a measuring instrument comprising, a pivot for the lower end of the shaft the lower end of the pivot being enlarged, a bearing post therefor comprising a hollow screw having its upper end contracted to form an opening about the pivot through which the pivot cannot be withdrawn, and a spring sustained member in said screw supporting the pivot.

2. A bearing for the shaft of a measuring instrument comprising, a pivot for the end of the shaft the lower portion being enlarged and carrying a jewel, a bearing post therefor comprising a hollow screw with its upper end contracted to form an opening about the pivot through which the pivot cannot be withdrawn, a spring supported member in said post carrying a jewel, and a ball in operative relation with the two jewels.

In witness whereof we have hereunto set our hands this twentieth day of April, 1904.

WILLIAM H. PRATT.
ALEXANDER J. R. FIEGO.

Witnesses:
DUGALD McK. McKILLOP,
JOHN J. WALKER.